US 10,527,216 B2

(12) United States Patent
Bishoff et al.

(10) Patent No.: US 10,527,216 B2
(45) Date of Patent: Jan. 7, 2020

(54) FLUID DELIVERY LINE ASSEMBLY WITH SHUT-OFF VALVE ASSEMBLY

(71) Applicant: Lorax Systems Inc., Halifax (CA)

(72) Inventors: Mark Bishoff, Halifax (CA); Guy Bishoff, Lethbridge (CA)

(*) Notice: Subject to any disclaimer, the term of this patent is extended or adjusted under 35 U.S.C. 154(b) by 0 days.

(21) Appl. No.: 16/344,362

(22) PCT Filed: Oct. 24, 2017

(86) PCT No.: PCT/IB2017/056597
§ 371 (c)(1),
(2) Date: Apr. 24, 2019

(87) PCT Pub. No.: WO2018/078526
PCT Pub. Date: May 3, 2018

(65) Prior Publication Data
US 2019/0271429 A1    Sep. 5, 2019

Related U.S. Application Data

(60) Provisional application No. 62/411,742, filed on Oct. 24, 2016.

(51) Int. Cl.
*F16L 55/10* (2006.01)
*F16K 7/12* (2006.01)
(Continued)

(52) U.S. Cl.
CPC ............ *F16L 55/1022* (2013.01); *F16K 7/12* (2013.01); *F16K 17/04* (2013.01); *G01M 3/2807* (2013.01); *Y10T 137/7836* (2015.04)

(58) Field of Classification Search
CPC ........ F16L 55/1022; F16K 7/12; F16K 17/04; G01M 3/2807; Y10T 137/7835; Y10T 137/7836
(Continued)

(56) References Cited

U.S. PATENT DOCUMENTS 2,445,612 A  *  7/1948  Fanshier ............. F16L 55/1022
                                                   137/460
4,004,607 A  *  1/1977  Freese ................... F16K 17/20
                                                   137/486
(Continued)

FOREIGN PATENT DOCUMENTS

WO    WO 2018/073508    5/2018

OTHER PUBLICATIONS

International Search Report and the Written Opinion dated Feb. 12, 2019 From the International Searching Authority Re. Application No. PCT/IB2017/056597 (8 Pages).

*Primary Examiner* — William M McCalister

(57) ABSTRACT

A fluid delivery line assembly comprising: a valve assembly including: a fluid passageway and a valve control chamber, a valve member disposed within the fluid passageway and movable between closed and open positions, a pressure-operated member disposed in the valve control chamber and operatively connected to the valve member to maintain the valve member in the open position when pressure within the pressure control chamber is above a predetermined opening pressure; a conduit having a main conduit passageway in fluid communication with the fluid passageway of the valve assembly and a secondary conduit passageway in communication with the valve control chamber; and an end connector including a main connector passageway in fluid communication with the main conduit passageway and a secondary connector passageway in fluid communication with the main connector passageway and with the secondary conduit passageway to allow fluid from the main connector passageway to enter the valve control chamber to allow the pressure inside the valve control chamber to reach the predetermined opening pressure.

20 Claims, 13 Drawing Sheets

(51) Int. Cl.
*F16K 17/04* (2006.01)
*G01M 3/28* (2006.01)

(58) Field of Classification Search
USPC .................................................. 137/509, 510
See application file for complete search history.

(56) References Cited

U.S. PATENT DOCUMENTS

| | | | |
|---|---|---|---|
| 4,074,692 A | 2/1978 | Shafer | |
| 4,100,932 A | 7/1978 | Schmitz | |
| 4,174,732 A * | 11/1979 | Freese | F16K 17/32 |
| | | | 137/498 |
| 4,341,235 A * | 7/1982 | Nord | F16L 39/02 |
| | | | 137/312 |
| 5,709,239 A | 1/1998 | Macalello et al. | |
| 5,931,184 A * | 8/1999 | Armenia | F16L 39/005 |
| | | | 137/312 |
| 6,025,788 A * | 2/2000 | Diduck | G01M 3/18 |
| | | | 340/3.4 |
| 6,185,986 B1 | 2/2001 | Nelson et al. | |
| 7,231,937 B2 | 6/2007 | Greene et al. | |
| 7,987,874 B2 * | 8/2011 | Knotten | F16L 39/02 |
| | | | 138/109 |
| 9,016,301 B2 * | 4/2015 | Tichborne | G01M 3/18 |
| | | | 137/68.11 |
| 2002/0088490 A1 * | 7/2002 | Selby | F17D 5/04 |
| | | | 137/312 |
| 2007/0074759 A1 * | 4/2007 | McClung, Jr. | F16K 17/34 |
| | | | 137/68.14 |
| 2007/0220957 A1 * | 9/2007 | Krah | G01M 3/2807 |
| | | | 73/49.5 |
| 2009/0126798 A1 | 5/2009 | Mather | |
| 2013/0092242 A1 * | 4/2013 | Guy | E03B 7/071 |
| | | | 137/2 |
| 2013/0104997 A1 | 5/2013 | Harper | |
| 2013/0291974 A1 * | 11/2013 | Bourgeois | F17D 5/02 |
| | | | 137/625.3 |
| 2014/0196802 A1 * | 7/2014 | Guy | E03B 7/071 |
| | | | 137/486 |

* cited by examiner

FLUID DELIVERY LINE ASSEMBLY WITH SHUT-OFF VALVE ASSEMBLY

RELATED APPLICATIONS

This application is a National Phase of PCT Patent Application No. PCT/IB2017/056597 having International filing date of Oct. 24, 2017, which claims the benefit of priority under 35 USC § 119(e) of U.S. Provisional Patent Application No. 62/411,742 filed on Oct. 24, 2016. The contents of the above applications are all incorporated by reference as if fully set forth herein in their entirety.

FIELD AND BACKGROUND OF THE INVENTION

The present invention relates to fluid delivery line assemblies, and more specifically to fluid delivery line assemblies with shut-off valve assemblies.

Fluid delivery lines are used to deliver fluid from a fluid source to a fluid-powered device or a fluid circuit. Fluid circuits such as natural gas lines are usually buried underground, which makes them generally difficult to access.

In some cases, the fluid delivery line includes a simple conduit such as a pipe. For various reasons, the conduit may become damaged and fluid may leak into the soil around the conduit. In this case, there may be a delay between the formation of the leak and the moment that the leak is detected by a person standing above ground over the conduit or by an operator remote from the conduit. During this delay, an important amount of fluid could be wasted and/or could infiltrate and pollute the soil around the conduit, or even make the soil unstable. If the fluid is natural gas, a leak could even create a danger of explosion.

Some fluid delivery lines may include a mechanical shut-off valve which would automatically prevent fluid from being delivered through the conduit if a fluid leak is detected. Unfortunately, with most valves, the entire fluid delivery line needs to be dug up to reset the valve and allow once again fluid to flow through the fluid delivery line once a leak is detected and the valve has been activated, which may involve significant work and costs.

Therefore, it would be desirable to have a fluid delivery line assembly which would overcome at least one of the above-identified drawbacks.

SUMMARY OF THE INVENTION

According to one aspect, there is provided a fluid delivery line assembly comprising: a valve assembly including: a valve body having a first port, a second port, a fluid passageway defined between the first and second ports, and a valve control chamber adjacent the fluid passageway for receiving fluid at a control pressure; a valve member disposed within the fluid passageway, the valve member being movable between a closed position in which passage of fluid through the fluid passageway is prevented and an open position in which passage of fluid through the fluid passageway is allowed; a pressure-operated member disposed in the valve control chamber, the pressure-operated member being operatively connected to the valve member to maintain the valve member in the open position when the control pressure within the pressure control chamber is above a predetermined opening pressure; a conduit having a first end connected to the second port of the valve assembly and a second end, the conduit including a main conduit passageway in fluid communication with the fluid passageway of the valve assembly, and a secondary conduit passageway adjacent the main conduit passageway and in communication with the valve control chamber; and an end connector having a first port connected to the second end of the conduit and a second port, the end connector including a main connector passageway in fluid communication with the main conduit passageway and a secondary connector passageway in fluid communication with the main connector passageway, the secondary connector passageway being further in communication with the secondary conduit passageway to allow fluid from the main connector passageway to enter the valve control chamber through the secondary connector passageway and through the secondary conduit passageway to allow the pressure inside the valve control chamber to reach the predetermined opening pressure.

In one embodiment, the end connector further includes a check valve disposed between the main connector passageway and the secondary connector passageway to allow fluid to enter the secondary connector passageway from the main connector passageway and to prevent fluid from exiting to the main connector passageway from the secondary connector passageway.

In one embodiment, the end connector further includes a flow-limiting orifice disposed between the main connector passageway and the secondary connector passageway.

In one embodiment, the valve assembly further includes a resilient member operatively connected to the valve member to bias the valve member towards the closed position.

In one embodiment, the conduit includes a cylindrical inner sidewall defining the main conduit passageway and a cylindrical outer sidewall concentrically and outwardly radially spaced from the inner sidewall, the secondary conduit passageway including an interstitial space defined between the inner and outer sidewalls.

In one embodiment, the valve body includes an interior cavity, and further wherein the pressure-operated member includes a membrane extending through the interior cavity to divide the interior cavity into the valve control chamber and an atmospheric pressure cavity in communication with an exterior of the valve body through a vent port defined in the valve body.

In one embodiment, the fluid delivery line assembly further comprises a vent conduit having a lower end connected to the vent port and an upper end located above ground.

In one embodiment, the end connector further includes a manual loading valve operatively coupled to the secondary connector passageway, the manual loading valve being connectable to a second fluid source for allowing fluid to enter the secondary connector passageway to manually adjust pressure inside the valve control chamber.

In one embodiment, the end connector further includes a switch operatively coupled to the secondary connector passageway for manually closing the secondary connector passageway and thereby preventing fluid from entering the secondary connector passageway from the main connector passageway.

In one embodiment, the end connector further includes at least one external access port in communication with one of the main connector passageway and the secondary connector passageway, each external access port being adapted to be connected to a monitoring device.

In one embodiment, the monitoring device includes an external pressure gauge.

In one embodiment, each external access port includes a corresponding cap adapted for closing the external access port.

According to another aspect, there is also provided an end connector for use with a valve assembly and a conduit, the valve assembly including a valve body having a first port, a second port, a fluid passageway defined between the first and second ports, and a valve control chamber adjacent the fluid passageway for receiving fluid at a control pressure, a valve member disposed within the fluid passageway, the valve member being movable between a closed position in which passage of fluid through the fluid passageway is prevented and an open position in which passage of fluid through the fluid passageway is allowed, a pressure-operated member disposed in the valve control chamber, the pressure-operated member being operatively connected to the valve member to maintain the valve member in the open position when the control pressure within the pressure control chamber is above a predetermined opening pressure, the conduit having a first end connected to the second port of the valve assembly and a second end, the conduit including a main conduit passageway in fluid communication with the fluid passageway of the valve assembly, and a secondary conduit passageway adjacent the main conduit passageway and in communication with the valve control chamber, the end connector comprising: a first port connected to the second end of the conduit and a second port, the end connector including a main connector passageway in fluid communication with the main conduit passageway and a secondary connector passageway in fluid communication with the main connector passageway, the secondary connector passageway being further in communication with the secondary conduit passageway to allow fluid from the main connector passageway to enter the valve control chamber through the secondary connector passageway and through the secondary conduit passageway to allow the pressure inside the valve control chamber to reach the predetermined opening pressure.

In one embodiment, the end connector further comprises a check valve disposed between the main connector passageway and the secondary connector passageway to allow fluid to enter the secondary connector passageway from the main connector passageway and to prevent fluid from exiting to the main connector passageway from the secondary connector passageway.

In one embodiment, the end connector further comprises a flow-limiting orifice disposed between the main connector passageway and the secondary connector passageway.

In one embodiment, the end connector further comprises a manual loading valve operatively coupled to the secondary connector passageway, the manual loading valve being connectable to a second fluid source for allowing fluid to enter the secondary connector passageway to manually adjust pressure inside the valve control chamber.

In one embodiment, the end connector further comprises a switch operatively coupled to the secondary connector passageway for manually closing the secondary connector passageway and thereby preventing fluid from entering the secondary connector passageway from the main connector passageway.

In one embodiment, the end connector further comprises at least one external access port in communication with one of the main connector passageway and the secondary connector passageway, each external access port being adapted to be connected to a monitoring device.

In one embodiment, the monitoring device includes an external pressure gauge.

In one embodiment, each external access port includes a corresponding cap adapted for closing the external access port.

BRIEF DESCRIPTION OF THE SEVERAL VIEW OF THE DRAWINGS

DESCRIPTION OF SPECIFIC EMBODIMENTS OF THE INVENTION

Figure 1:
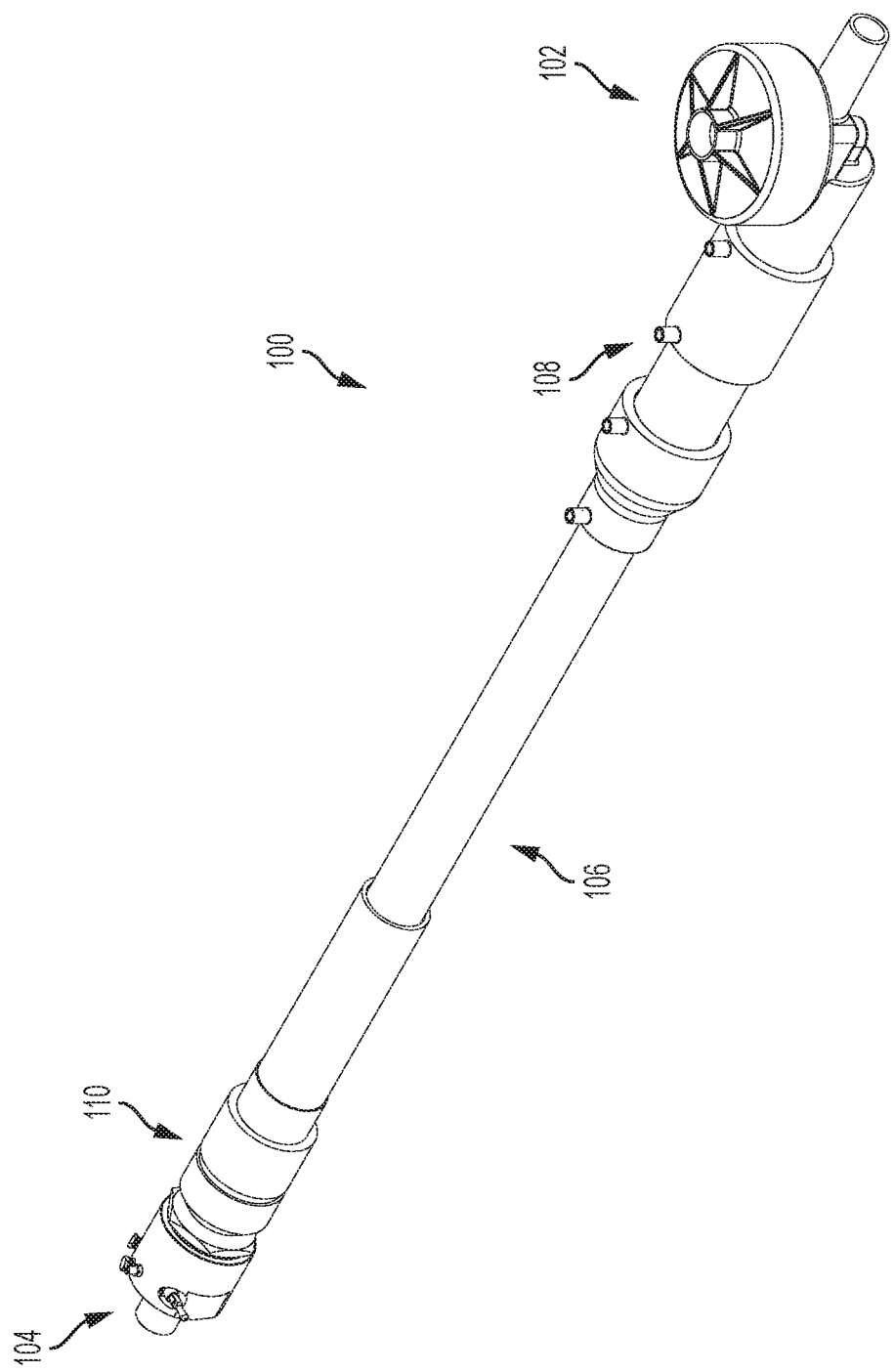
FIG. 1 is top perspective view of a fluid delivery line assembly, in accordance with one embodiment.
Figure 2:
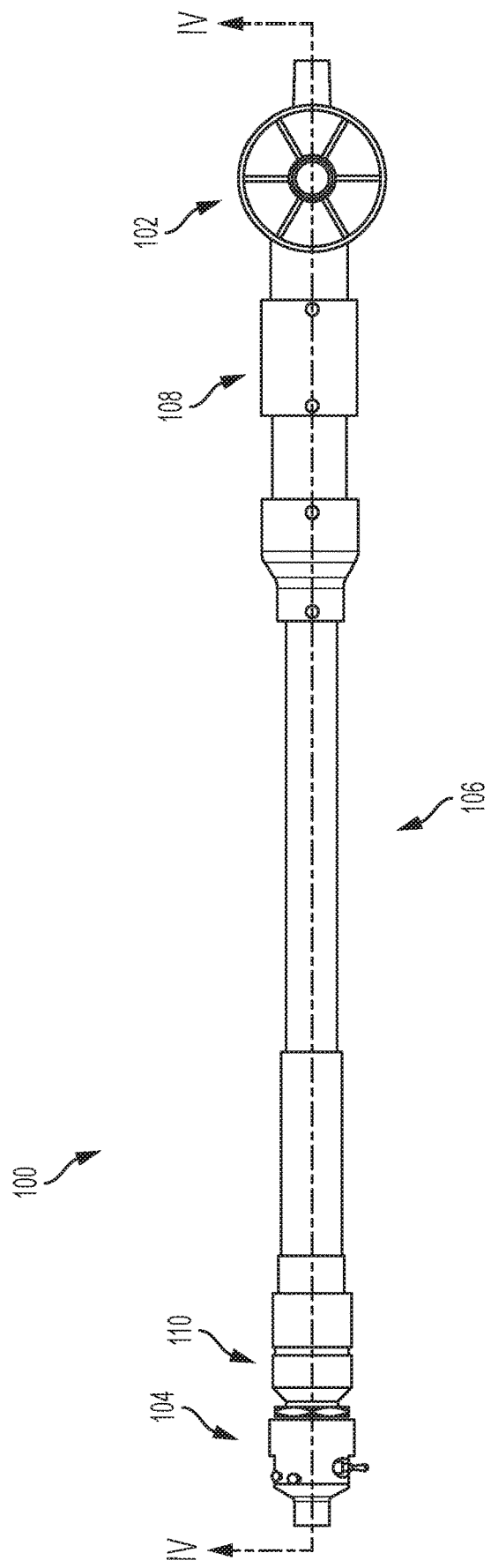
FIG. 2 is a top plan view of the fluid delivery line assembly illustrated in FIG. 1.
Figure 3:
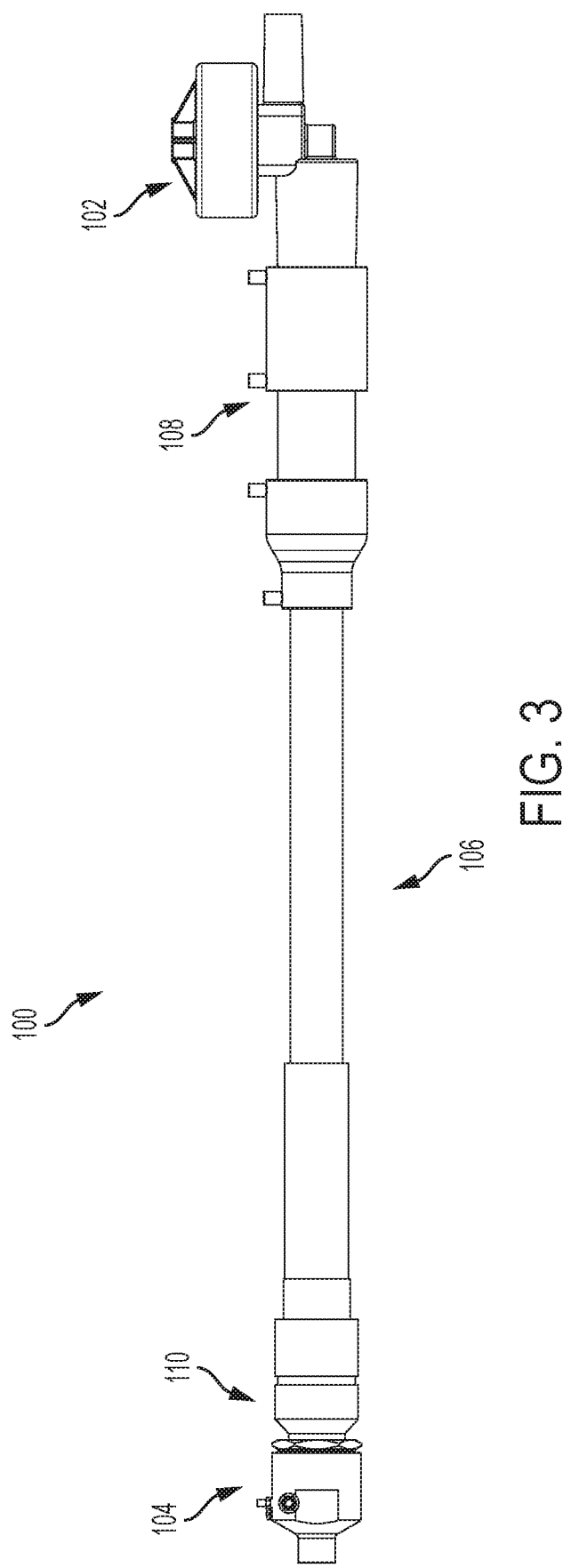
FIG. 3 is a side elevation view of the fluid delivery line assembly illustrated in FIG. 1.
Figure 4:
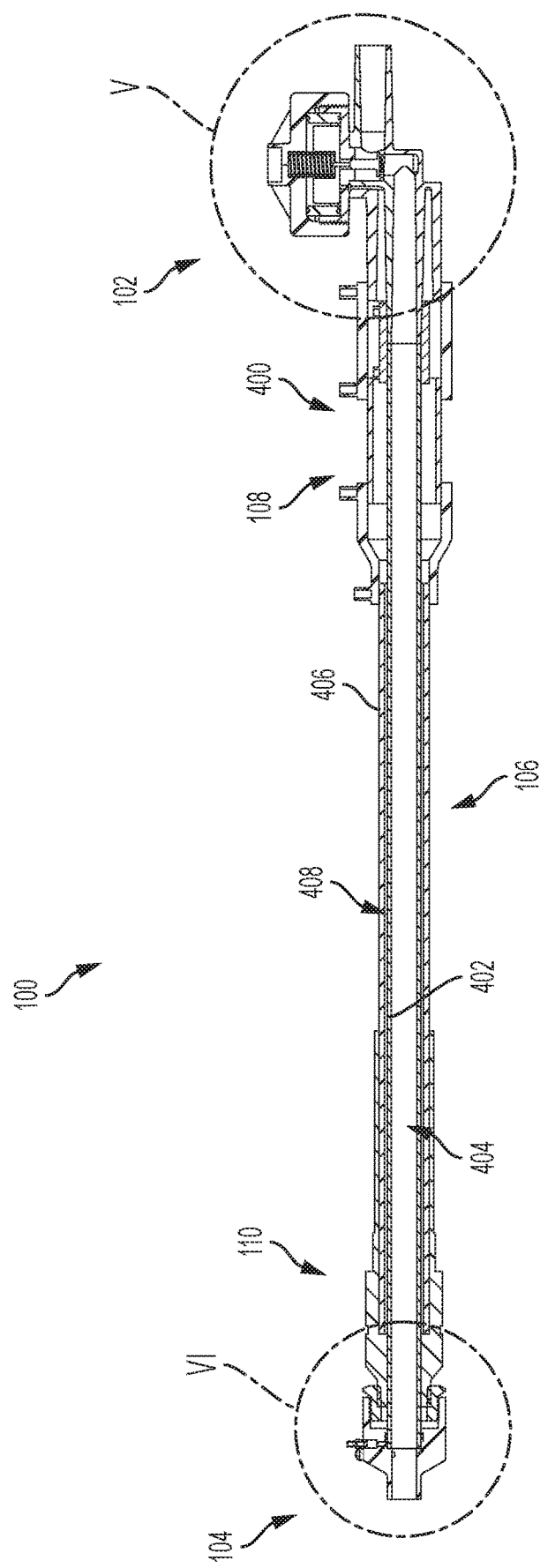
FIG. 4 is a longitudinal cross-section view, taken along cross-section line IV-IV of FIG. 2, showing the interior of the fluid delivery line assembly illustrated in FIG. 1.

Referring to FIGS. 1 to 4, there is shown a fluid delivery line assembly 100, in accordance with one embodiment. The fluid delivery line assembly 100 is generally adapted to be buried underground, but could instead be disposed above ground surface.

In the illustrated embodiment, the fluid delivery line assembly 100 includes a valve assembly 102 adapted to be operatively connected to a fluid source, not shown, an end connector 104 adapted to be connected to a fluid receiving port, also not shown, and a conduit 106 operatively connecting the valve assembly 102 to the end connector 104 to allow fluid communication between the valve assembly 102 and the end connector 104. Specifically, the conduit 106 has a first end 108 connected to the valve assembly 102 and a second end 110 connected to the end connector 104.

Figure 5:
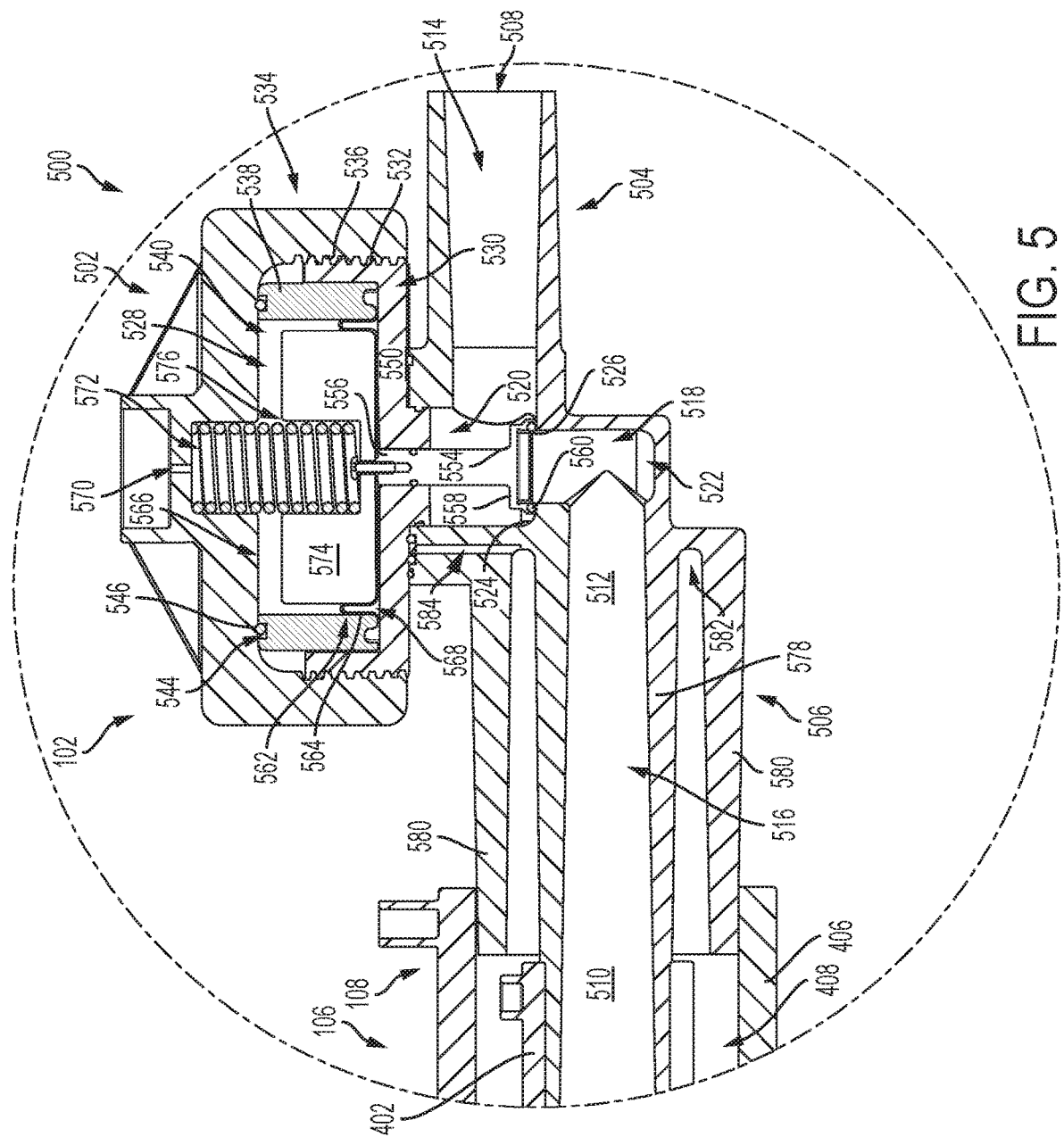
FIG. 5 is an enlarged portion taken from area V of the cross-section view of FIG. 4, showing the interior of a valve assembly for the fluid delivery line assembly illustrated in FIG. 1.

Referring now to FIG. 5, the valve assembly 102 includes a hollow valve body 500 which includes a top cylindrical head portion 502, a first elongated conduit portion 504 and a second elongated conduit portion 506.

The valve body 500 further includes a first port 508 defined in the first elongated conduit portion 504, a second port 510 defined in the second elongated conduit portion 506 and a valve fluid passageway 512 extending between the first and second ports 508, 510 to allow fluid to flow through the valve body 500 from the first port 508 to the second port 510 or from the second port 510 to the first port 508. In the illustrated embodiment, the first port 508 defines an inlet which is adapted to be connected to the fluid source and the second port 510 defines an outlet which is adapted to be connected to the conduit 106. Alternatively, the first port 508 could instead define the outlet and the second port 510 could define the inlet.

In the illustrated embodiment, the first elongated conduit portion 504 and the second elongated conduit portion 506 respectively define an inlet axis and an outlet axis which are parallel to each other, but are disposed on different level such that the first elongated conduit portion 504 is closer to the head portion 502 than the second elongated conduit portion 506. Alternatively, the inlet axis and the outlet axis could be angled relative to each other, or could be in a common horizontal plane.

Still in the illustrated embodiment, the fluid passageway 512 includes an inlet portion 514 defined in the first elongated conduit portion 504, an outlet portion 516 defined in the second elongated conduit portion 506 and a generally vertical central portion 518 which is generally aligned with the head portion 502 of the valve body 500. The central portion 518 includes a generally cylindrical top cavity 520 aligned with and in communication with the inlet portion 514 and a generally cylindrical bottom cavity 522 aligned with and in communication with the outlet portion 516. In the illustrated embodiment, the top cavity 520 is slightly larger than the bottom cavity 522 and thereby defines a shoulder 524 between the top and bottom cavities 520, 522. Still in the illustrated embodiment, an annular lip 526 further extends upwardly from the shoulder 524 into the top cavity 520.

Still referring to FIG. 5, the head portion 502 is hollow and defines an interior cavity 528 of the valve body 500. In the illustrated embodiment, the head portion 502 includes a cylindrical base 530 having a threaded outer surface 532 and a cylindrical cap 534 having an outer threaded surface 536 which corresponds to the threaded outer surface 532 of the base 530, such that the cap 534 can be screwed onto the base 530. Alternatively, the cap 534 could be secured to the base 530 by welding or using any other securing technique that a skilled addressee would consider appropriate. In another embodiment, the cap 534 and the base 530 could instead be integrally formed with each other.

In the illustrated embodiment, the head portion 502 further includes a hollow cylindrical member 538 with open top and bottom ends 540 which is received in the interior cavity 528 between the cap 534 and the base 530. Specifically, the cylindrical member 538 has a diameter which is slightly smaller than an inner diameter of the base 530. The cylindrical member 538 further includes a top annular groove 544 which is sized and shaped to receive an 0-ring seal or toric joint 546. When the cylindrical member 538 is received in the base 530 and the cap 534 is screwed onto the base 530, the cylindrical member 538 therefore defines a sidewall of the interior cavity 528.

In the illustrated embodiment, the interior cavity 528 is isolated from the fluid passageway 512. Specifically, the base 530 includes a bottom wall 550 which separates the interior cavity 528 from the top cavity 520 of the fluid passageway 512.

Still in the illustrated embodiment, the valve assembly 102 further includes an elongated valve member 552 disposed in the fluid passageway 512 between the first and second ports 508, 510 for selectively allowing and preventing passage of fluid through the fluid passageway 512. More specifically, the valve member 552 extends through the bottom wall 550 of the head portion 502 and includes a first end 554 which is disposed in the top cavity 520 of the fluid passageway 512 and a second end 556 which is disposed generally within the bottom wall 550 or in the interior cavity 528.

The valve member 552 is adapted for slidably moving between a closed position in which passage of fluid through the fluid passageway 512 is prevented and an open position in which passage of fluid through the fluid passageway 512 is allowed. Specifically, the first end 554 of the valve member 552 includes a recessed disc 558 which extends transversely relative to the valve member 552. When the valve member 552 is in the closed position, the recessed disc 558 abuts the shoulder 524 to prevent fluid from flowing between the top and bottom cavities 520, 522. In the illustrated embodiment, the valve member 552 further includes an O-ring 560 which is disposed within the recessed disc 558 and around the annular lip 526 to further sealingly close the fluid passageway 512 when the valve member 552 is in the closed position. Alternatively, the valve member 552 could be configured differently.

Still referring to FIG. 5, the valve assembly 102 further includes a pressure-operated member 562 disposed in the interior cavity 112. In the illustrated embodiment, the pressure-operated member 562 includes a membrane 564. Alternatively, the pressure-operated member 562 could instead include a piston or a member having another configuration that a skilled person would consider to be suitable.

Still the illustrated embodiment, the membrane 564 extends through the interior cavity 528 to divide the interior cavity 528 into a first sub-cavity 566 and a second sub-cavity 568. The first sub-cavity 566 is located away from the valve member 552 and is in fluid communication with a vent port 570 defined in the head portion 502 of the valve body 500. In one embodiment, the valve assembly 102 is buried underground and the vent port 570 is operatively connected to a vent conduit, not shown, which extends up to an upper end located above ground. This configuration allows the first sub-cavity 566 to be maintained at atmospheric pressure.

In the illustrated embodiment, the valve assembly 102 further includes a resilient element, such as a compression helical spring 572, which is connected to the valve member 552 to bias the valve member 552 towards the closed position. Specifically, the valve assembly 102 includes a cylindrical block 574 which is disposed in the first sub-cavity 566 and which is attached to the membrane 564. The block 574 includes a generally circular central recess 576 which faces towards the first sub-cavity 566 and which is sized and shaped to receive the spring 572. The spring 572 abuts the block 574 and the cap 534 and therefore biases the block 574 and the membrane 564 downwardly. The block 574 is further secured to the second end 556 of the valve member 552 by a fastener, with the membrane 564 sandwiched between the block 574 and the second end 556 of the valve member 552. In this configuration, the membrane 564 is therefore operatively connected to the valve member 552, such that movement of the membrane 564 towards and away from the bottom wall 550 of the head portion 502 therefore causes axial movement of the valve member 552.

Still in the illustrated embodiment, the membrane 564 is adapted for moving the valve member 552 towards the open position when a predetermined opening pressure is reached in the second sub-cavity 568. Specifically, the spring 572 exerts a certain force on the block 574 and therefore on the valve member 552 to maintain the valve member 552 in the closed position, and the membrane 564 is adapted to exert a force in the opposite direction on the valve member 552 to counter the force of the spring 572. For example, the pressure in the second sub-cavity 568 necessary to counteract the force of the spring 572 could be 13 psi. In this example, any pressure higher than 13 psi in the second sub-cavity 568 would compress the spring 572 and move the valve member 552 at least partially towards the open position. It will be understood that the block 574 further acts as a stop and abuts the cap 534 to limit axial movement of the valve member 552 into the interior cavity 528.

Still referring to FIG. 5, the second elongated conduit portion 506 includes a cylindrical inner wall 578 and a cylindrical outer sidewall 580 which is spaced radially outwardly from the inner cylindrical wall 578 to define an interstitial space 582 between the inner wall 578 and the outer sidewall 580. A connecting conduit 584 further extends between the interstitial space 582 and the second sub-cavity 568 to allow communication between the interstitial space 582 and the second sub-cavity 568.

Turning back now to FIG. 4, the conduit 106 is adapted to be sealingly connected to the valve assembly 102 using a connection assembly 400 which engages the second elongated conduit portion 506 of the valve body 108. Alternatively, the conduit 106 could be sealingly connected to the valve assembly 102 using a quick connect nut or similar devices, or techniques such as electrofusion and the like.

In the illustrated embodiment, the conduit 106 is a double-walled conduit. More specifically, the conduit 106 includes an inner sidewall 402 which defines a main conduit passageway 404 and an outer sidewall 406 which is outwardly radially spaced from the inner sidewall 402 to define a secondary conduit passageway or interstitial space 408 between the inner sidewall 402 and the outer sidewall 406. The interstitial space 408 is adapted to be in fluid communication with the second sub-cavity 568 of the valve assembly 102 via the interstitial space 582 of the second elongated conduit portion 506 and the connecting conduit 584.

Figure 6:
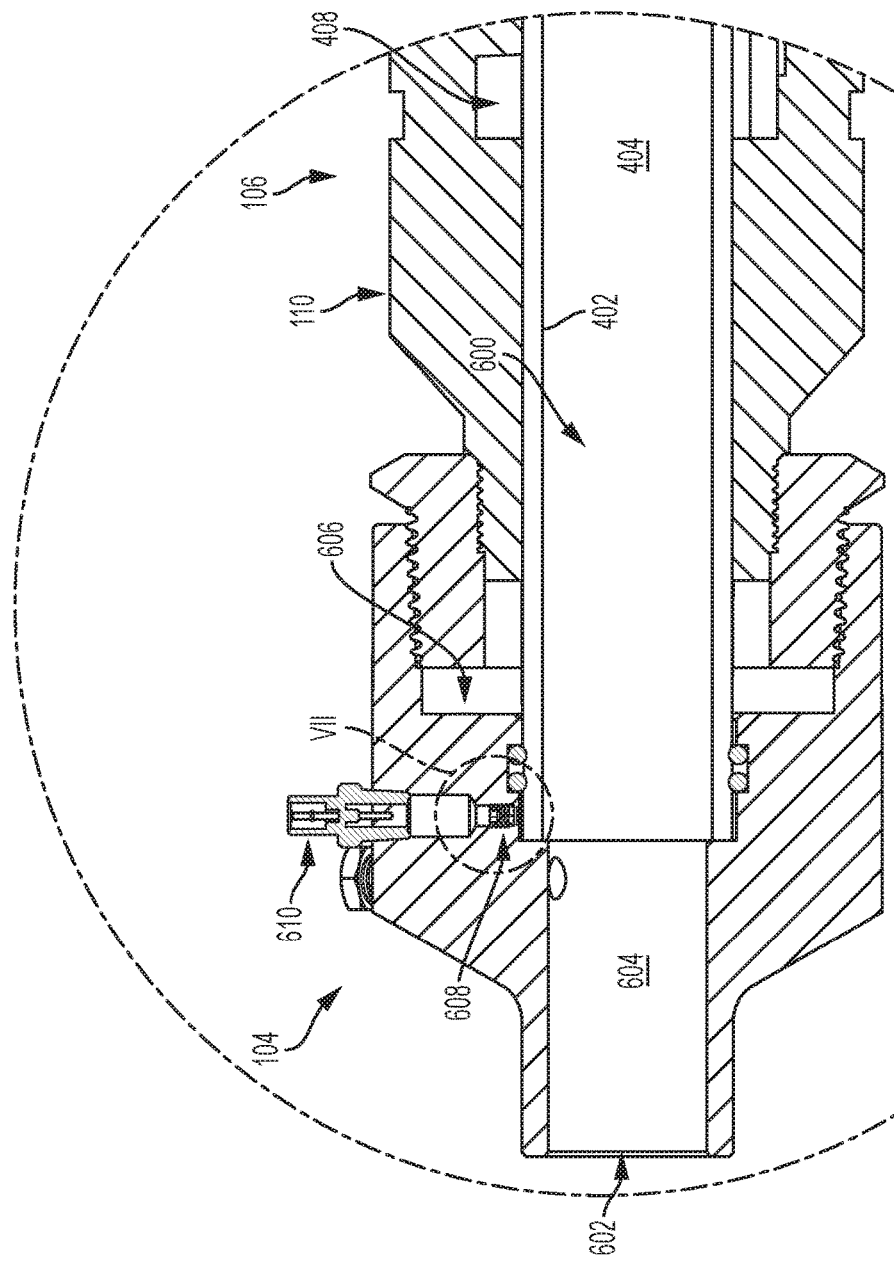
FIG. 6 is an enlarged portion taken from area VI of the cross-section view of FIG. 4, showing the interior of an end connector for the fluid delivery line assembly illustrated in FIG. 1.
Figure 7:
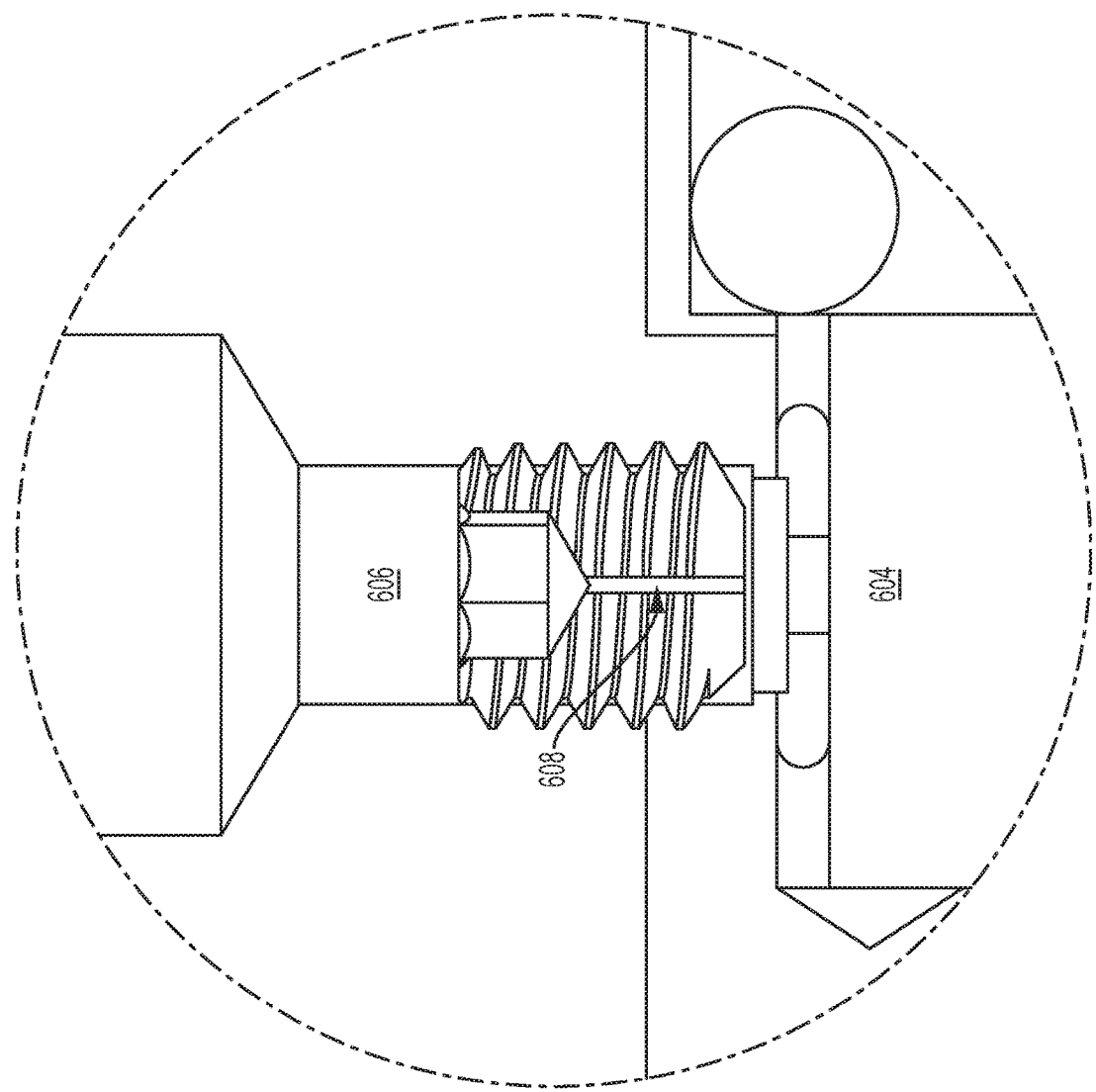
FIG. 7 is an enlarged portion taken from area VII of FIG. 6, showing details of a flow-limiting orifice for the end connector illustrated in FIG. 1.
Figure 8:
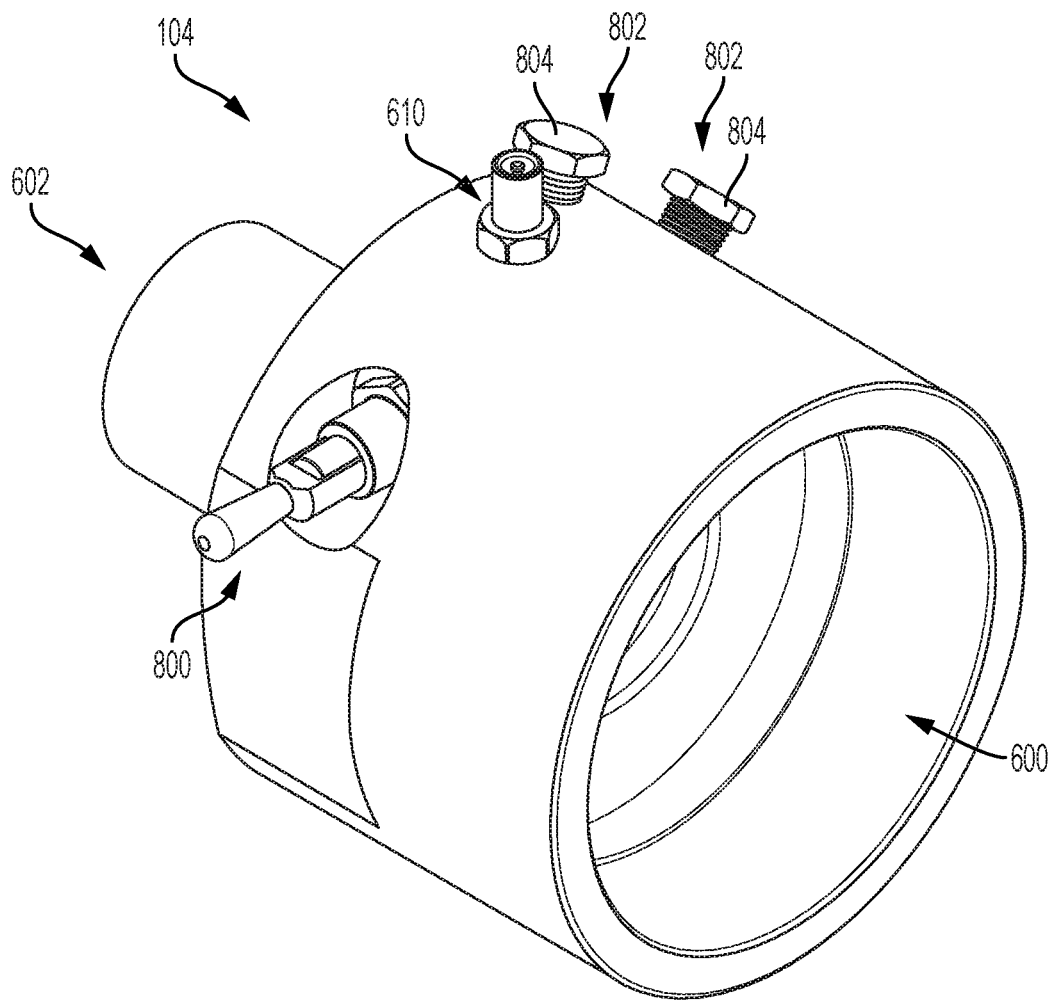
FIG. 8 is a top perspective view of an end connector for the fluid delivery line assembly illustrated in FIG. 1.
Figure 9:
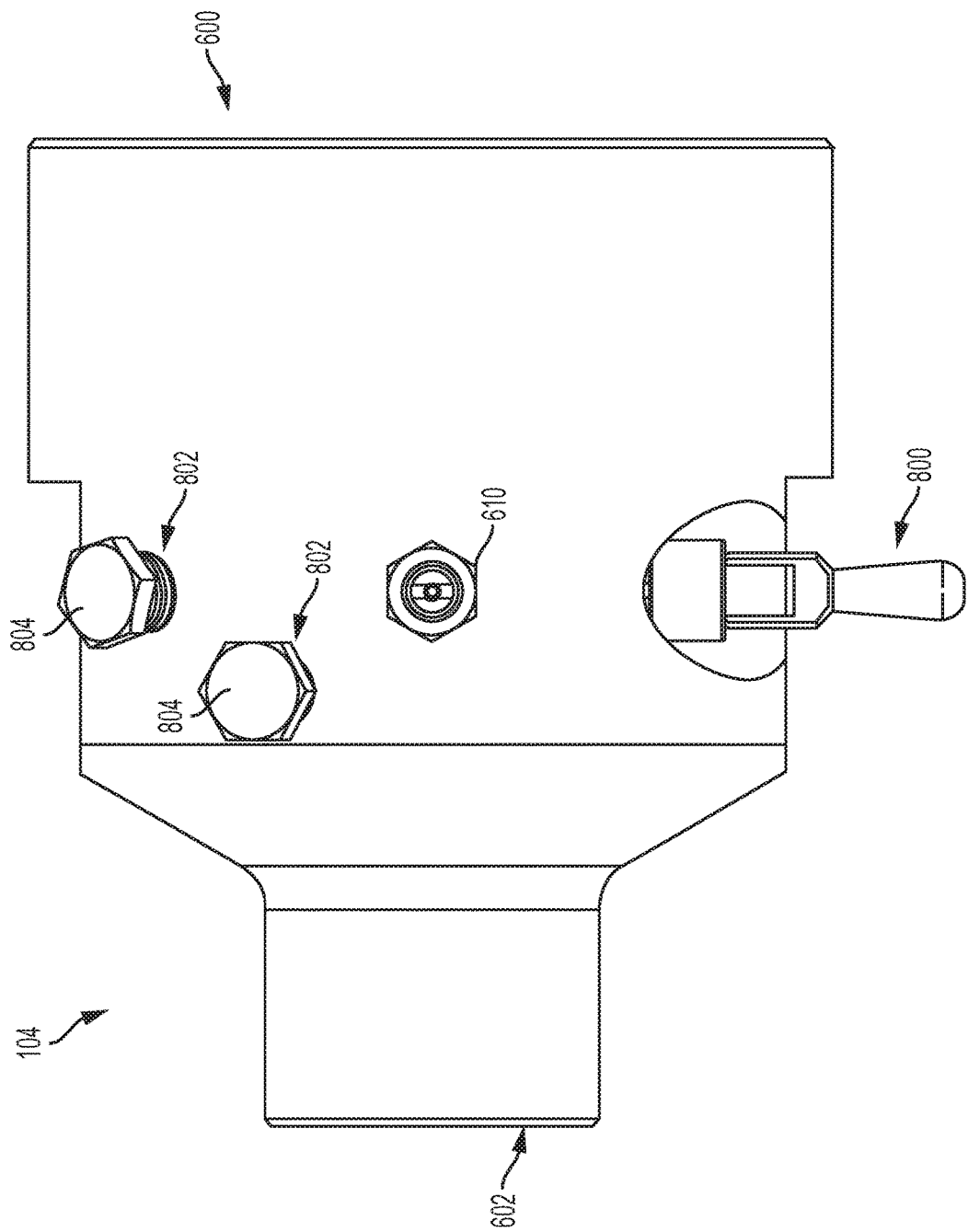
FIG. 9 is a top plan view of the end connector illustrated in FIG. 1.
Figure 10:
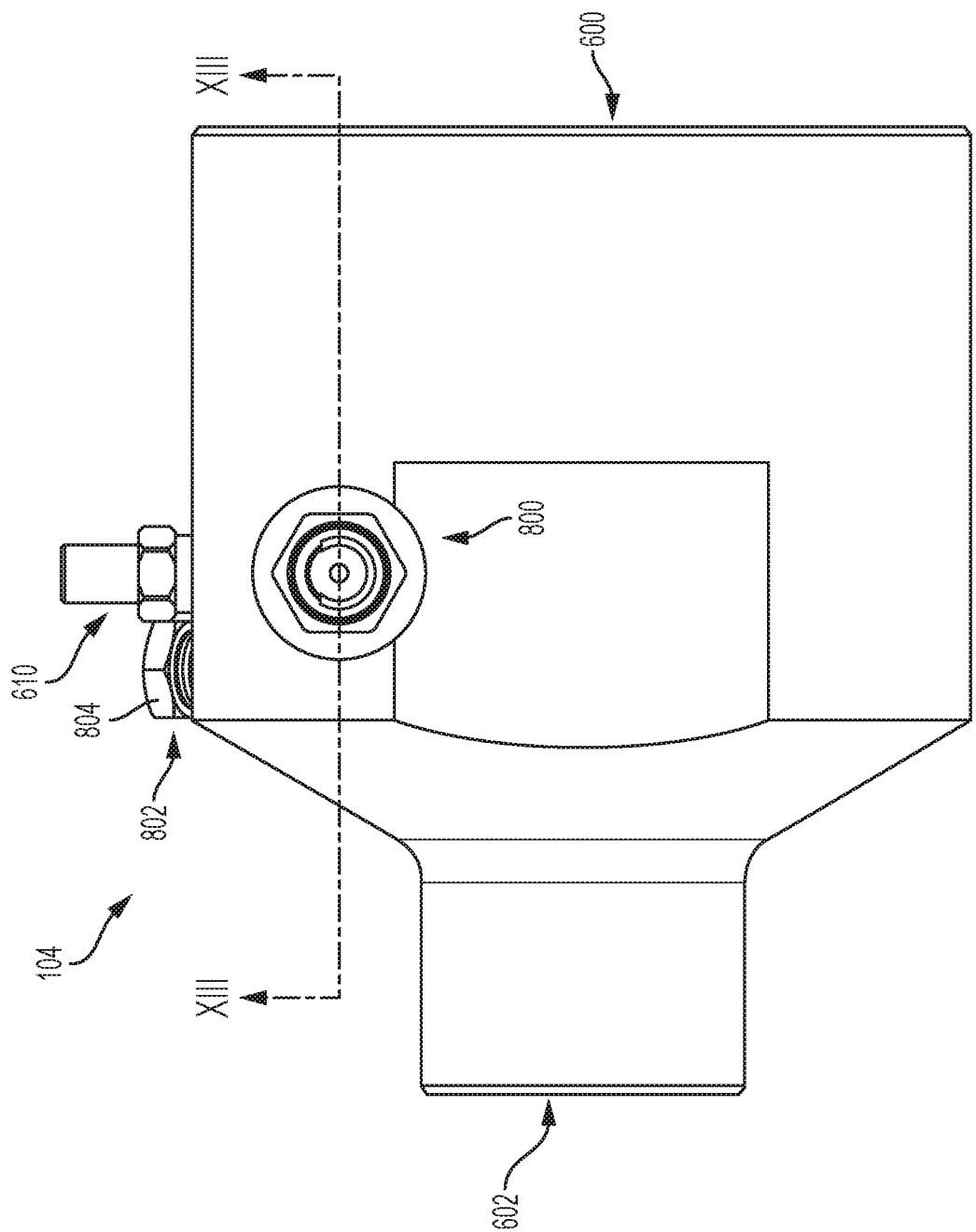
FIG. 10 is a left side elevation view of the end connector illustrated in FIG. 1.
Figure 11:
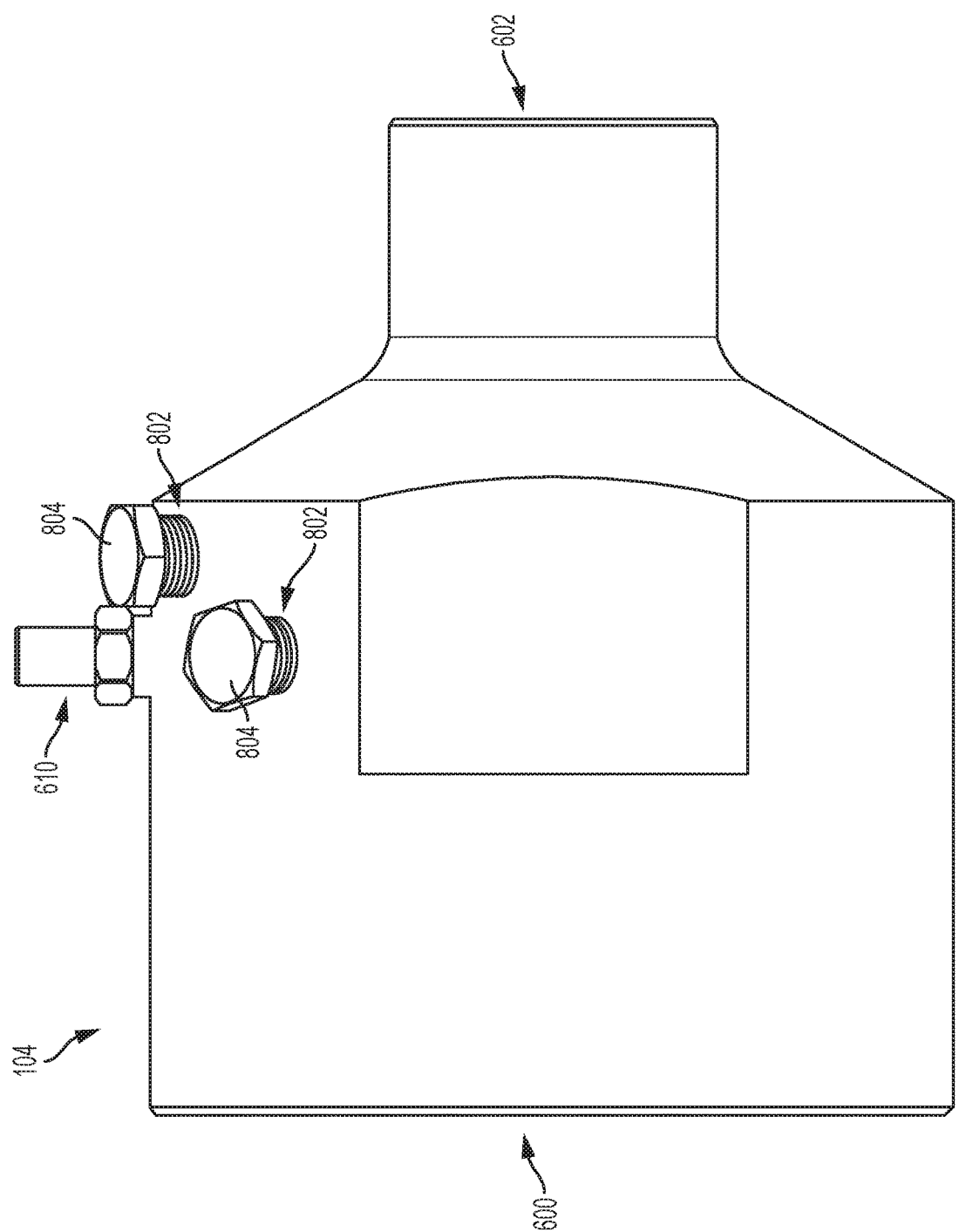
FIG. 11 is a right side elevation view of the end connector illustrated in FIG. 1.
Figure 12:
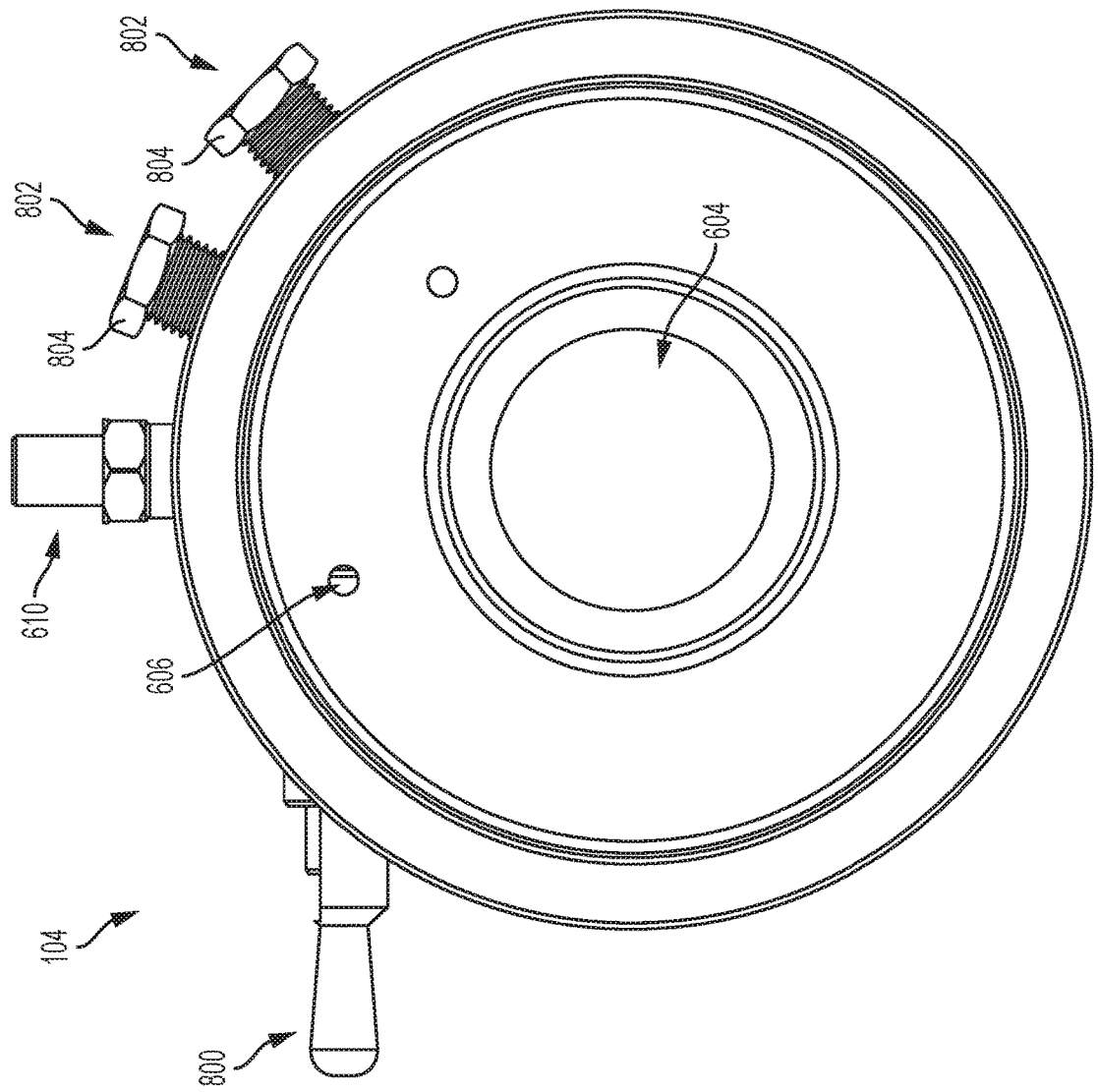
FIG. 12 is a front elevation view of the end connector illustrated in FIG. 1.
Figure 13:
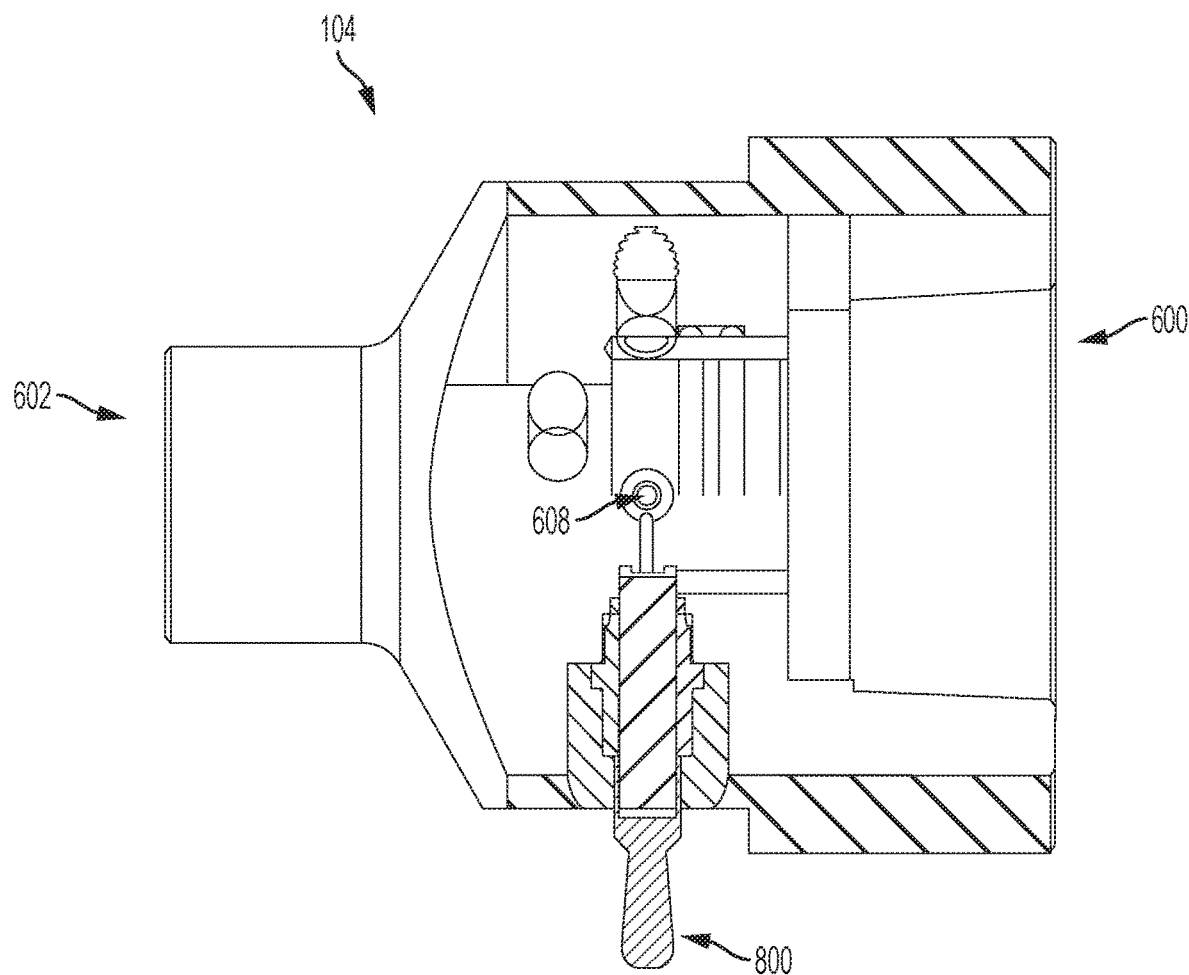
FIG. 13 is a cross-section view, taken along cross-section line XIII-XIII of FIG. 10, showing details of the switch for the end connector illustrated in FIG. 1.

Referring now to FIGS. 6 and 7, the end connector 104 includes a first port 600, a second port 602 and a main connector passageway 604 extending between the extending between the first and second ports 600, 602. In the illustrated embodiment, the first port 600 defines an inlet adapted to be sealingly connected to the second end 110 of the conduit 106 and the second port 602 defines an outlet adapted to be connected to a fluid receiving port of a fluid-receiving circuit or device such as a gas houseline, a domestic plumbing circuit, a gas/water-powered appliance or the like.

In the illustrated embodiment, the end connector 104 further includes a secondary connector passageway 606 in fluid communication with the main connector passageway 604 and a flow-limiting orifice 608 disposed between the main connector passageway 604 and the secondary passageway 606, which allows communication between the main connector passageway 604 and the secondary passageway 606. Still in the illustrated embodiment, the end connector 104 further includes a check valve, not shown, also disposed between the main connector passageway 604 and the secondary connector passageway 606 to allow fluid to enter the secondary passageway 606 from the main connector passageway 604 and to prevent fluid from exiting to the connector passageway 604 from the secondary connector passageway 606.

When the conduit 106 is connected to the end connector 104, the secondary connector passageway 606 is in fluid communication with the interstitial space 408 of the conduit 106. When the conduit 106 is further connected to the valve assembly 102, the second sub-cavity 568 is also in fluid communication with the interstitial space 408 via the interstitial space 582 of the second elongated conduit portion 506 and the connecting conduit 584. When the valve assembly 102, the end connector 104 and the conduit 106 are connected together, the fluid passageway 512 of the valve assembly 102, the main connector passageway 604 of the end connector 104 and the main conduit passageway 404 of the conduit 106 are in fluid communication and together define a first or main passageway. Similarly, the second sub-cavity 568 of the valve assembly 102, the secondary connector passageway 606 of the end connector 104 and the interstitial space 408 of the conduit 106 are in fluid communication and together define a second or control passageway.

In the illustrated embodiment, the end connector 104 further includes a manual loading valve 610 such as a Schrader valve coupled to the secondary connector passageway 606. The manual loading valve 610 is adapted to be connected to a second fluid source, not shown, for allowing fluid to enter the secondary connector passageway 606 to manually adjust pressure inside the control passageway. The manual loading valve 610 may further be used to increase the pressure to at least partially move the valve member 552 from a closed position to an open position. Alternatively, the end connector 104 may not include a manual loading valve 610.

Referring to FIGS. 8 to 13, the end connector 104 further includes a switch 800 operatively coupled to the secondary connector passageway 606 for manually closing the secondary connector passageway 606 and thereby preventing fluid from entering the control passageway from the main passageway. Alternatively, the end connector 104 may not comprise a switch 800.

Still in the illustrated embodiment, the end connector 104 further includes one or more additional ports 802 which may be connected to external pressure gauges or other devices and which may be closed with corresponding caps 804 during operation of the fluid delivery line assembly 100 if no such device is used. Alternatively, the end connector 104 may not comprise any additional ports 802.

In operation, the valve assembly 102 is connected to the fluid source, the end connector 104 is connected to the fluid-receiving port and the conduit 106 connects the valve assembly 102 to the end connector 104. Initially, the pressure inside the control passageway could be generally equal to or even lower than atmospheric pressure such that the valve member 552 is in the closed position and is maintained in the closed position by the spring 572. In this configuration, fluid is prevented from flowing through the fluid delivery line assembly 100.

In one embodiment, the pressure in the control passageway could then be increased by introducing fluid in the control passageway through the manual loading valve 610. In one embodiment, the fluid delivery line assembly 100 is buried underground and fluid is introduced through the manual loading valve 610 from a fluid source which is located above the ground surface.

Once the pressure in the control passageway is above the pressure threshold required to counteract the spring 572, the membrane 564 bulges towards the cap 534 and moves the valve member 552 at least partially towards the open position.

Once the valve member 552 is at least partially in the open position, fluid can flow through the main passageway. A portion of fluid flowing through the end connector 104 enters the control passageway through the flow-limiting orifice 608 at a predetermined flow rate and is prevented from exiting the control passageway by the check valve provided in the secondary connector passageway 606. Pressure in the control passageway is thereby further increased in order to move the valve member 552 further towards a fully open position until the block 574 abuts the cap 534 of the valve body 500, or until the pressure in the control passageway becomes substantially equal to the pressure in the main passageway and therefore no longer increases.

It will be understood that from this configuration, a leak in the fluid delivery line assembly 100 would cause fluid to escape the control passageway at a rate which would be higher than the rate at which the flow-limiting orifice 608 allows fluid to enter the control passageway, creating a sudden pressure drop in the control passageway which would cause the spring 572 to move the valve member 552 in the closed position.

It will further be understood that when the valve member 552 is in the closed position, the fluid is prevented from flowing through the main passageway, causing pressure to decrease in the main passageway as well.

In one embodiment, a "leak test" to detect leaks in the main passageway or in other parts of the fluid circuit to which the fluid delivery line system 100 is connected may be performed by closing the switch 800 to prevent fluid from entering the control passageway and by increasing pressure inside the first sub-cavity 566 of the valve assembly 102 through the vent port 570 to maintain the valve member 552 in the closed position.

What is claimed is:

1. A fluid delivery line assembly comprising:
   a valve assembly including:
      a valve body having a first port, a second port, a fluid passageway defined between the first and second ports, and a valve control chamber adjacent the fluid passageway for receiving fluid at a control pressure;
      a valve member disposed within the fluid passageway, the valve member being movable between a closed position in which passage of fluid through the fluid passageway is prevented and an open position in which passage of fluid through the fluid passageway is allowed;
      a pressure-operated member disposed in the valve control chamber, the pressure-operated member being operatively connected to the valve member to maintain the valve member in the open position when the control pressure within the pressure control chamber is above a predetermined opening pressure;
   a conduit having a first end connected to the second port of the valve assembly and a second end, the conduit including a main conduit passageway in fluid communication with the fluid passageway of the valve assembly, and a secondary conduit passageway adjacent the main conduit passageway and in communication with the valve control chamber; and
   an end connector having a first port connected to the second end of the conduit and a second port, the end connector including a main connector passageway in fluid communication with the main conduit passageway and a secondary connector passageway in fluid communication with the main connector passageway, the secondary connector passageway being further in communication with the secondary conduit passageway to allow fluid from the main connector passageway to enter the valve control chamber through the secondary connector passageway and through the secondary conduit passageway to allow the pressure inside the valve control chamber to reach the predetermined opening pressure.

2. The fluid delivery line assembly as claimed in claim 1, wherein the end connector further includes a check valve disposed between the main connector passageway and the secondary connector passageway to allow fluid to enter the secondary connector passageway from the main connector passageway and to prevent fluid from exiting to the main connector passageway from the secondary connector passageway.

3. The fluid delivery line assembly as claimed in claim 1, wherein the end connector further includes a flow-limiting orifice disposed between the main connector passageway and the secondary connector passageway.

4. The fluid delivery line assembly as claimed in claim 1, wherein the valve assembly further includes a resilient member operatively connected to the valve member to bias the valve member towards the closed position.

5. The fluid delivery line assembly as claimed in claim 1, wherein the conduit includes a cylindrical inner sidewall defining the main conduit passageway and a cylindrical outer sidewall concentrically and outwardly radially spaced from the inner sidewall, the secondary conduit passageway including an interstitial space defined between the inner and outer sidewalls.

6. The fluid delivery line assembly as claimed in claim 1, wherein the valve body includes an interior cavity, and further wherein the pressure-operated member includes a membrane extending through the interior cavity to divide the interior cavity into the valve control chamber and an atmospheric pressure cavity in communication with an exterior of the valve body through a vent port defined in the valve body.

7. The fluid delivery line assembly as claimed in claim 6, further comprising a vent conduit having a lower end connected to the vent port and an upper end located above ground.

8. The fluid delivery line assembly as claimed in claim 1, wherein the end connector further includes a manual loading valve operatively coupled to the secondary connector passageway, the manual loading valve being connectable to a second fluid source for allowing fluid to enter the secondary connector passageway to manually adjust pressure inside the valve control chamber.

9. The fluid delivery line assembly as claimed in claim 1, wherein the end connector further includes a switch operatively coupled to the secondary connector passageway for manually closing the secondary connector passageway and thereby preventing fluid from entering the secondary connector passageway from the main connector passageway.

10. The fluid delivery line assembly as claimed in claim 1, wherein the end connector further includes at least one external access port in communication with one of the main connector passageway and the secondary connector passageway, each external access port being adapted to be connected to a monitoring device.

11. The fluid delivery line assembly as claimed in claim 10, wherein the monitoring device includes an external pressure gauge.

12. The fluid delivery line assembly as claimed in claim 10, wherein each external access port includes a corresponding cap adapted for closing the external access port.

13. An end connector for use with a valve assembly and a conduit, the valve assembly including a valve body having a first port, a second port, a fluid passageway defined between the first and second ports, and a valve control chamber adjacent the fluid passageway for receiving fluid at a control pressure, a valve member disposed within the fluid passageway, the valve member being movable between a closed position in which passage of fluid through the fluid passageway is prevented and an open position in which passage of fluid through the fluid passageway is allowed, a pressure-operated member disposed in the valve control chamber, the pressure-operated member being operatively connected to the valve member to maintain the valve member in the open position when the control pressure within the pressure control chamber is above a predetermined opening pressure, the conduit having a first end connected to the second port of the valve assembly and a second end, the conduit including a main conduit passageway in fluid communication with the fluid passageway of the valve assembly, and a secondary conduit passageway adjacent the main conduit passageway and in communication with the valve control chamber, the end connector comprising:

a first port connected to the second end of the conduit and a second port, the end connector including a main connector passageway in fluid communication with the main conduit passageway and a secondary connector passageway in fluid communication with the main connector passageway, the secondary connector passageway being further in communication with the secondary conduit passageway to allow fluid from the main connector passageway to enter the valve control chamber through the secondary connector passageway and through the secondary conduit passageway to allow the pressure inside the valve control chamber to reach the predetermined opening pressure.

14. The end connector as claimed in claim 13, further comprising a check valve disposed between the main connector passageway and the secondary connector passageway to allow fluid to enter the secondary connector passageway from the main connector passageway and to prevent fluid from exiting to the main connector passageway from the secondary connector passageway.

15. The end connector as claimed in claim 13, further comprising a flow-limiting orifice disposed between the main connector passageway and the secondary connector passageway.

16. The end connector as claimed in claim 13, further comprising a manual loading valve operatively coupled to the secondary connector passageway, the manual loading valve being connectable to a second fluid source for allowing fluid to enter the secondary connector passageway to manually adjust pressure inside the valve control chamber.

17. The end connector as claimed in claim 13, further comprising a switch operatively coupled to the secondary connector passageway for manually closing the secondary connector passageway and thereby preventing fluid from entering the secondary connector passageway from the main connector passageway.

18. The end connector as claimed in claim 13, further comprising at least one external access port in communication with one of the main connector passageway and the secondary connector passageway, each external access port being adapted to be connected to a monitoring device.

19. The end connector as claimed in claim 18, wherein the monitoring device includes an external pressure gauge.

20. The end connector as claimed in claim 18, wherein each external access port includes a corresponding cap adapted for closing the external access port.

\* \* \* \* \*